3,244,748
5H-DIBENZO[a,d]CYCLOHEPTENES
Max Tishler, Westfield, John M. Chemerda, Metuchen, and Janos Kollonitsch, Westfield, N.J., assignors to Merck & Co. Inc., Rahway, N.J., a corporation of New Jersey
No Drawing. Filed July 3, 1962, Ser. No. 207,423
2 Claims. (Cl. 260—562)

This invention relates to a process for the production of 5H-dibenzo[a,d]cycloheptenes. In particular, the invention relates to the preparation of 5H-dibenzo[a,d]cycloheptenes which are substituted at the 5-position with a secondary aminopropyl. More particularly, the invention is concerned with the preparation of 5-(3-methylaminopropyl)-5H-dibenzo[a,d] - cycloheptene. The invention also relates to novel compounds utilized in the process and their preparation.

In accordance with the process of the present invention, an alkali metal derivativeof 5H-dibenzo[a,d]-cycloheptene is reacted with a 3-(N-acyl-N-methyl)-amino-propyl halide and the resulting 5-[3-(N-acyl-N-methyl)-aminopropyl]-5H-dibenzo[a,d] cycloheptene hydrolyzed to form the desired product. This process may be illustrated as follows:

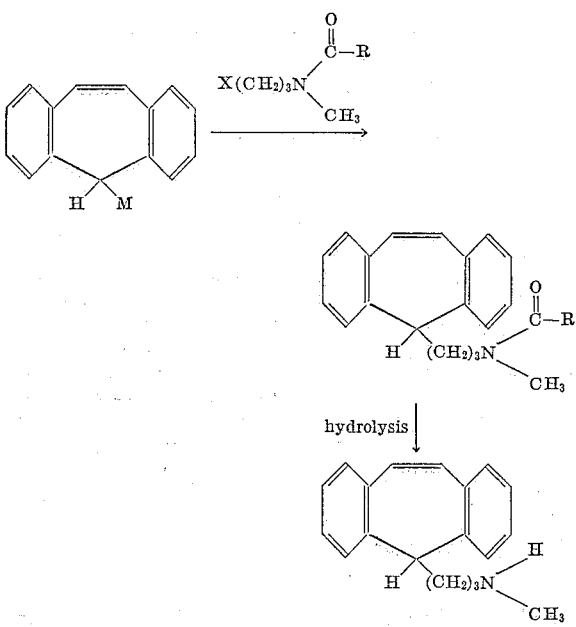

wherein M represents an alkali metal such as sodium, potassium or lithium; X is a halogen, preferably chlorine or bromine; and R is a radical selected from the group consisting of hydrogen, alkyl, cycloalkyl, aralkyl and aryl. The compounds may also have substituents on one or both of the benzenoid rings and/or on the propyl chain. It will be readily apparent to those skilled in the art that inasmuch as the R group is removed during the process, it is not critical which particular group is utilized to form the intermediate acid amide and the choice thereof is subject only to the limitations of ease of hydrolysis and other practical and economical considerations. However, the preferred groups are alkyl and aryl.

The starting compound, namely, the alkali metal derivative of 5H - dibenzo[a,d]cycloheptene may be readily prepared by reacting 5H-dibenzo[a,d]cycloheptene with a metalating reagent such as, for example, sodium amide, potassium amide, phenylsodium, butyllithium and the like. The sodium and potassium derivatives may be prepared using the process described by Villani, J. Med. and Pharm. Chem., 5, pp. 373–382 (1962). The lithium derivative may be prepared in analogous manner using butyllithium.

The 3-(N-acyl-N-methyl)-aminopropyl halides may be prepared by reacting 3-methylaminopropanol-1 with an acid amide to form the corresponding 3-(N-acyl-N-methyl)-aminopropanol-1 and then converting this to the halide by treatment with a halogenating agent which will replace the hydroxy group with a halogen. This may be illustrated as follows:

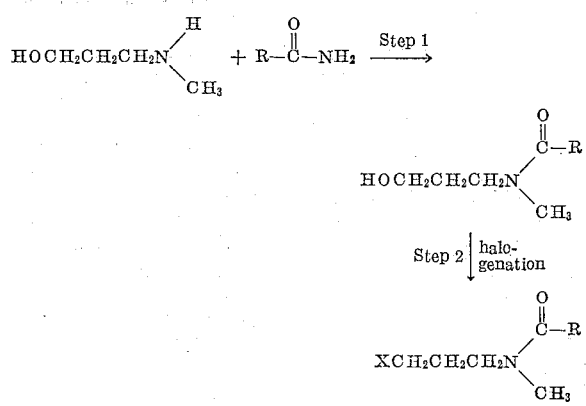

wherein X and R are as previously defined. However, as pointed out hereinabove, although R is preferably an alkyl or aryl radical, it is not critical which particular group is utilized to form the halide reactant since the group is subsequently removed during the process.

The reaction (Step 1) is suitably carried out in the presence of an inert, substantially organic solvent. However, in the case of formamide (i.e., where R=H) which is a liquid or other of the amides which melt at elevated temperatures, a solvent is not necessary since the amide can be utilized as such. The choice of solvent, when employed, is not critical and a wide variety can be utilized. Representative of these are ethyleneglycoldimethylether, diethyleneglycoldimethylether, dioxane and propyleneglycoldiethyether. The temperature at which the reaction is carried out is not critical. The reaction may be carried out at elevated temperatures and preferably at the reflux temperature of the system. Likewise, the ratio of reactants is not critical and equimolar amounts may be used although it is preferred to employ an excess of the acid amide. After completion of the reaction, the solvent is removed and the desired product recovered. Further purification of the product can be achieved by fractional distillation under vacuum.

Halogenation (Step 2) of the 3-(N-acyl-N-methyl)-aminopropanol-1 is accomplished using an appropriate halogenating agent such as the thionyl halides, for example, thionyl chloride and thionyl bromide; the hydrohalides such as hydrogen chloride and hydrogen bromide, phosphorus trichloride and the like. The reaction is suitably carried out in the presence of an inert, substantially anhydrous organic solvent. The choice of solvent is not critical and suitable solvents for the reaction include pyridine, benzene, toluene, heptene, chloroform and carbon tetrachloride. The temperature at which the reaction is carried out is not critical. The reaction may be carried out at room temperature or at elevated temperatures. However, in certain instances the reaction may be highly exothermic and therefore it is desirable to maintain the temperature below about 100° C. Likewise, the ratio of reactants is not critical and equimolar amounts may be used although it is preferred to employ an excess of the halogenating agent. After completion of the reaction, the solvent is removed and the desired product recovered. Further purification of the product can be achieved by fractional distillation under vacuum.

The reaction between the alkali metal derivative of 5H-dibenzo[a,d]cycloheptene and the 3-(N-acyl-N-methyl)-aminopropyl halide is carried out in an inert, substantially anhydrous organic solvent. The choice of solvent is not critical. Suitable solvents include the aromatic hydrocarbons such as benzene, toluene and the like; aliphatic hydrocarbons such as heptene, hexane and the like; ethers such as diethylether, diamylether and the like. Equimolar amounts of reactants are preferably employed and the reaction proceeds at room temperature. However, the temperature is not critical and elevated temperatures up to the reflux temperature of the system may be used. After completion of the reaction, the solvent is removed and the acid amide derivative recovered. Further purification can be achieved by fractional distillation under vacuum.

Conversion to the 5-(3-methylaminopropyl)-5H-dibenzo[a,d]cycloheptene is accomplished by hydrolyzing the acid amide derivative. While this may be carried out under either acidic or basic conditions, employing alcoholic solutions of potassium hydroxide, sodium hydroxide, hydrochloric acid, acetic acid and the like as the hydrolyzing medium, the hydrolysis is preferably conducted under basic conditions.

The end compounds, namely, 5-(3-methylaminopropyl)-5H-dibenzo[a,d]cycloheptene, prepared by the process of the present invention, is useful in the treatment of mental health conditions as it is an anti-depressant and serves as a mood elevator or a psychic energizer. For this purpose, the daily dosage is within the range of 5-250 mg., preferably taken in divided amounts over the day.

The following examples are given for purposes of illustrating the present invention and are not to be construed as limiting the invention.

*Example 1.*—Preparation of 3-(N-formyl-N-methyl)-aminopropanol-1

A mixture of 40 g. of 3-methylaminopropanol-1 and 20 g. of formamide is heated while stirring for 4 hours at 165° C. The crude product is fractionated in vacuo using a Widmer column yielding substantially pure 3-(N-formyl-N-methyl)-aminopropanol-1.

*Example 2*

Following the procedure of Example 1 and employing acetamide, propionamide, butyramide, benzamide and phenylacetamide in place of formamide, there is obtained 3-(N-acetyl-N-methyl)-aminopropanol-1, 3-(N-propionyl-N - methyl) - aminopropanol - 1, 3 - (N - butyryl - N-methyl)-aminopropanol-1, 3-(N-benzoyl-N-methyl)-aminopropanol-1 and 3-(N-phenylacetyl-N-methyl)-aminopropanol-1, respectively.

*Example 3.*—Preparation of 3-(N-formyl-N-methyl)-aminopropyl chloride 50 g. of 3-(N-formyl-N-methyl)-aminopropanol-1 obtained in Example 1 is dissolved in a mixture of 100 ml. of chloroform and 25 g. of pyridine. 40 g. of thionyl chloride is then slowly added while maintaining the temperature below 65° C. After 6 hours of refluxing, the mixture is washed with water, then with sodium bicarbonate solution and again with water and then dried over magnesium sulfate and the solvent distilled off in vacuo. Fractional distillation at 1 mm. pressure yields substantially pure 3-(N-formyl-N-methyl)-aminopropyl chloride.

*Example 4*

Following the procedure of Example 3 and employing 3-(N-acetyl-N-methyl)-aminopropanol-1, 3-(N-benzoyl-N-methyl) - aminopropanol - 1 and 3 - (N - phenylacetyl-N-methyl)-aminopropanol-1 in place of 3-(N-formyl-N-methyl)-aminopropanol-1, there is obtained the corresponding propyl chloride.

*Example 5.*—Preparation of 5-[3-(N-formyl-N-methyl)-aminopropyl]-5H-dibenzo[a,d]cycloheptene To a suspension of 3.9 g. of potassium amide is slowly added a solution of 19.2 g. (0.1 mole) of 5H-dibenzo[a,d]-cycloheptene in 600 ml. of ether with stirring. The suspension is refluxed with stirring for 3 hours, then cooled to room temperature and a solution of 0.1 mole of 3-(N-formyl-N-methyl)-aminopropyl chloride in 100 ml. of ether added. The mixture is then refluxed with stirring for 5 hours and then 100 ml. of water added. The ether layer is then washed with dilute hydrochloric acid, then water and then dried over magnesium sulfate and evaporated to dryness yielding 5-[3-(N-formyl-N-methyl)-aminopropyl]-5H-dibenzo[a,d]cycloheptene.

*Example 6*

Following the procedure of Example 5 and employing equivalent quantities of 3-(N-acetyl-N-methyl)-aminopropyl chloride, 3-(N-benzoyl-N-methyl)-aminopropyl chloride and 3-(N-phenylacetyl-N-methyl)-aminopropyl chloride in place of 3-(N-formyl-N-methyl)-aminopropyl chloride, there is obtained, respectively, 5-[3-(N-acetyl-N - methyl) - aminopropyl] - 5H - dibenzo[a,d]cycloheptene, 5 - [3 - (N - benzoyl - N - methyl) - aminopropyl]-5H - dibenzo[a,d]cycloheptene and 5 - [3 - (N - phenylacetyl - N - methyl) - aminopropyl] - 5H - dibenzo[a,d]-cycloheptene.

*Example 7.*—Preparation of 5-(3-methylaminopropyl)-5H-dibenzo[a,d]cycloheptene from 5-[3-(N-formyl-N-methyl)-aminopropyl]-5H-dibenzo[a,d]cycloheptene 29.5 g. of 5-[3-(N-formyl-N-methyl)-aminopropyl]-5H-dibenzo[a,d]cycloheptene is refluxed for 24 hours under nitrogen in a solution of 36.3 g. of potassium hydroxide in 378 ml. of n-butanol. After cooling to room temperature, the solvent is evaporated in vacuo, the residue is stirred with 200 ml. of water, 300 ml. of n-hexane, the layers separated, the water layer extracted with 100 ml. of n-hexane and the combined hexane layers washed with water (2 x 100 ml.) and then with 0.5 N sulfuric acid (100 x 80 x 80 ml.). The acid solution is then alkalized and extracted with ether (2 x 150 ml. and 1 x 100 ml.), dried over MgSO$_4$ and the solution evaporated to dryness yielding substantially pure 5-(3-methylaminopropyl)-5H-dibenzo[a,d]cycloheptene.

*Example 8*

Following the procedure of Example 7 and employing equivalent quantities of 5-[3-(N-acetyl-N-methyl)-aminopropyl]-5H-dibenzo[a,d]cycloheptene, 5-[3-(N-benzoyl-N - methyl) - aminopropyl] - 5H - dibenzo[a,d]cycloheptene and 5-[3-(N-phenylacetyl-N-methyl)-aminopropyl]-5H-dibenzo[a,d]cycloheptene, there is similarly obtained 5-(3-methylaminopropyl)-5H-dibenzo[a,d]cycloheptene.

We claim:
1. A compound of the formula

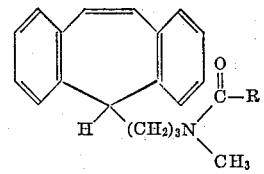

wherein R is selected from the group consisting of hydrogen, lower alkyl, phenyl and benzyl.

2. 5 - [3 - (N - formyl - N - methyl) - aminopropyl]-5H-dibenzo[a,d]cycloheptene.

References Cited by the Examiner

UNITED STATES PATENTS

| 2,574,505 | 11/1951 | Sletzinger et al. | 260—561 X |
| 2,736,641 | 2/1956 | Mattson et al. | 260—558 |
| 2,837,518 | 6/1958 | Jacob et al. | 260—561 X |
| 2,985,660 | 5/1961 | Judd et al. | 260—293 |
| 3,073,847 | 1/1963 | Doebel et al. | 260—328 |

OTHER REFERENCES

Smith et al.: "J. Org. Chem.," vol. 23, pages 1599–1603 (1958).

Migrdichian: Organic Synthesis, vol. 1, p. 377, New York, Reinhold, 1957.

Noller: Chemistry of Organic Compounds, 2nd Edition, p. 246, Philadelphia, Saunders, 1957.

WALTER A. MODANCE, *Primary Examiner.*

DUVAL T. McCUTCHEN, NICHOLAS S. RIZZO,
*Examiners.*